March 15, 1949.  W. M. VIVIAN  2,464,659
FILM REEL BAND
Filed March 23, 1945

Inventor
William M. Vivian.

By Clarence A. O'Brien
and Harvey B. Jacobson
Attorneys

Patented Mar. 15, 1949

2,464,659

UNITED STATES PATENT OFFICE 2,464,659

FILM REEL BAND

William M. Vivian, Brooklyn, N. Y.

Application March 23, 1945, Serial No. 584,468

2 Claims. (Cl. 33—128)

This invention relates to a film reel band, and more particularly to such a band adapted to hold a reel of motion picture film in position on its associated reel.

A primary object of this invention is the provision of an improved film reel band, provided with spaced buttons, adapted to be passed around the wound film on a reel, and having a string adapted to extend between the buttons to secure the film to the reel, thus obviating the necessity of the customary string or the like, which had a tendency to become disengaged.

An additional important object of this invention is the provision of such a band provided with markings or graduations thereon, whereby the quantity of film on the reel may be readily determined, in accordance with the diameter thereof as indicated by the relative position of the ends of the band.

A still further object of the invention is the provision of such a reel provided with indicia designed to show the length of time the quantity of film on the reel will run.

Other objects will in part be obvious and in part be pointed out as the description of the invention proceeds and shown in the accompanying drawing wherein there is disclosed a preferred embodiment of this inventive concept.

In the drawing.

Similar reference characters refer to similar parts throughout the several views of the drawings.

Figure 1:
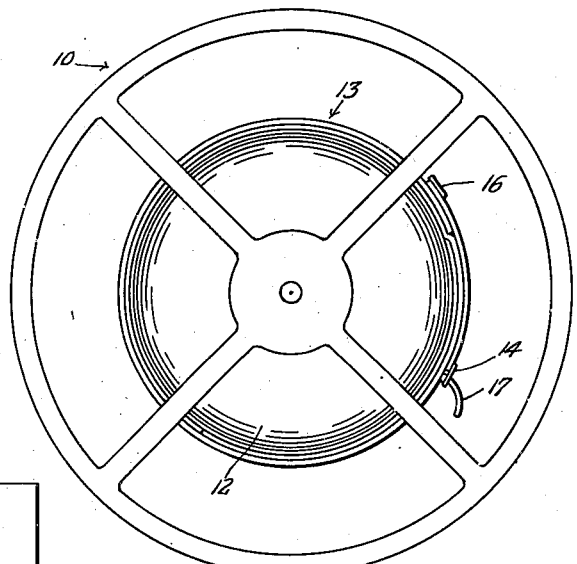
Figure 1 is a side elevational view of a film reel showing the band of the instant invention in place thereon.
Figure 3:
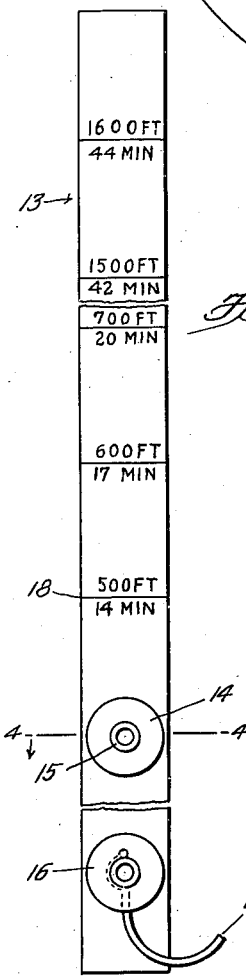
Figure 3 is a fragmentary plan view, partially broken away, of the band of the instant invention, as disassociated from the reel.
Figure 4:
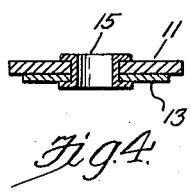
Figure 4 is a sectional view taken substantially along the line 4—4 of Figure 3, as viewed in the direction indicated by the arrows.

Having reference now to the drawings there is generally indicated at 10 a film reel, comprised of side plates 11, and a spindle, about which is adapted to be wound a reel of film 12. The film 12 is held in position by the band of the instant invention, generally indicated at 13.

The band 13 is of a length sufficient to surround a reel of film of maximum length, such for example as 1600 feet, and is provided at a spaced distance from one end with a fibre button 14 or the like held in position on the band as by means of an eyelet 15. Adjacent the other end of the band is a second button 16, similar to the button 14, to which is permanently secured a string 17. At measured and spaced intervals between the first named end of the band and the button 14 are markings 18, each indicative of the footage of film on the reel, and each provided with indicia designating the time it will require such a length of film to run. These markings are so arranged, that when the band is in position as shown in Figure 1, the end of the band covers all the markings up to, but not including, that indicative of the actual footage of film on the reel, measured in accordance with the diameter of the reel.

Figure 2:
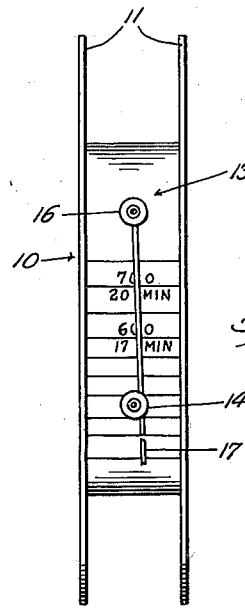
Figure 2 is an end elevational view of the construction shown in Figure 1.

In the operation of the device the band is positioned about the film, as shown in Figures 1 and 2, and tightened until the end thereof overlies the marked portion, in such manner as to conceal all of the indicia indicative of a greater length of film, than that which is actually on the reel. The string 17 is then wound about the button 14, and tightened, and the film is held securely in position until such time as the band is removed.

From the foregoing it will now be seen that there is herein provided an improved film band which accomplish all the objects of this invention, and others including many advantages of great practical utility, which securely retains the film in related assembly with the reel, dispensing with the necessity for a string entirely surrounding the same, or the like, which indicates exactly in accordance with the diameter of the reel the quantity and footage of film contained thereon, and which additionally indicates the length of time such film will require to be run through a projector.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a film reel band, a band portion, a button secured to said band adjacent one end, a second button secured to said band at a point spaced from the other end, a string secured to one of said buttons, and graduations denoting the footage of film in accordance with the diameter of the reel on said band said graduation being positioned between said second mentioned button and said other end of said band.

2. In a film reel band, a band portion, a button secured to said band adjacent one end, a second button secured to said band at a point spaced from the other end, a string secured to one of said buttons, graduations denoting the footage of film in accordance with the diameter of the reel on said band, and indicia denoting the length of time said film will require to run, said graduations and indicia being positioned between said second-mentioned button and its associated band end.

WILLIAM M. VIVIAN.

REFERENCES CITED

The following references are of record in the file of this patent:

UNITED STATES PATENTS

| Number | Name | Date |
|---|---|---|
| 947,879 | Worstall | Feb. 1, 1910 |
| 1,345,129 | Clarke | June 29, 1920 |
| 1,497,236 | Happe | June 10, 1924 |
| 1,857,523 | Wittel | May 10, 1932 |
| 1,970,487 | Bowman | Aug. 14, 1934 |
| 2,172,675 | Goldberg | Sept. 12, 1939 |